(No Model.)
A. KEITH.
METAL WHEEL.
No. 401,563. Patented Apr. 16, 1889.
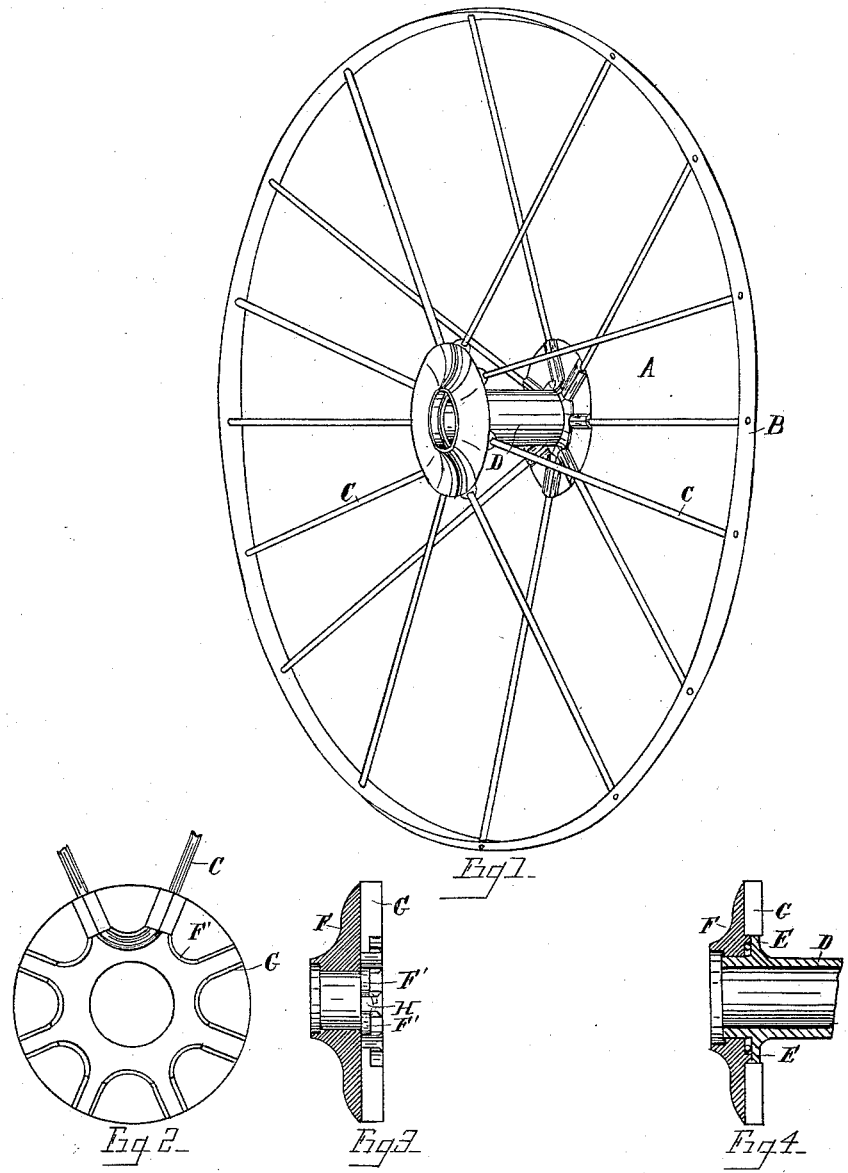
WITNESSES
Carroll J. Webster.
F. L. P. Kloeppinger.
INVENTOR
Alpheus Keith
By William Webster
Attorney

UNITED STATES PATENT OFFICE.

ALPHEUS KEITH, OF TOLEDO, OHIO.

METAL WHEEL.

SPECIFICATION forming part of Letters Patent No. 401,563, dated April 16, 1889.

Application filed January 3, 1889. Serial No. 295,316. (No model.)

*To all whom it may concern:*

Be it known that I, ALPHEUS KEITH, a citizen of the United States, residing at Toledo, in the county of Lucas and State of Ohio, have invented certain new and useful Improvements in Metal Wheels; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to metal wheels of the character used for children's carriages, bicycles, velocipedes, &c., and has for its object simplicity of parts, strength, and cheapness.

Heretofore in the branch of the art to which my invention belongs the spokes have been confined between disks that necessarily require the nicest adjustment to secure the same in position to prevent the several parts of the hub from loosening and thus relaxing their proper tension upon the spokes; or, in other constructions where single disks have been used, the disks have of necessity been formed with flanges, through which the spokes are passed. In other forms of wheels where return-spokes are used the spokes have been passed through grooves formed in the collars and then secured to the rim. It has been found in practice that a wheel to sustain the usual jar and impact should be properly suspended—*i. e.*, the several spokes should be in such a state of equilibrium of tension from the hub (the central fastening) that an impact upon one portion of the rim will cause an equal tension upon each spoke. It therefore becomes essential that the spokes shall have not only a proper fastening to secure the same to the oppositely-arranged disks of the hub, but that there shall be a provision for holding the spokes from radial movement when an impact is given to any part of the periphery of the wheel.

The object of my invention is to suspend the rim of the wheel by means of spokes having a central fastening, in such a manner that any impact given to the rim or tire shall be met by an equal pull upon the remainder of the circumference of the wheel, whereby the rim shall at all times maintain its circular form.

A further object is to provide a hub comprising a thimble and two disks, each disk being so formed as to allow of being constructed of malleable cast-iron with any desired exterior appearance, the inner faces being formed with curved bearing-shoulders to receive the bent portions of the spokes, and with lips or lugs adapted to be closed upon the spokes to secure the same in place relatively to the disks, whereby the several parts may be constructed at a minimum expense and assembled without the aid of skilled labor.

The invention consists in the parts and combination of parts hereinafter described, and pointed out in the claims.

In the drawings, Figure 1 is a perspective view of a complete wheel constructed in accordance with my invention. Fig. 2 is a plan view of one of the disks, showing one of the spokes secured thereto. Fig. 3 is a longitudinal vertical section of one of the disks, and Fig. 4 is a like view with the thimble in place.

A designates the wheel, having a rim, B, and spokes C, the spokes being of the character known as "return-spokes."

D designates a box or thimble formed with flanges E, one at each end, against which bear disks F, to which the inner end of each return-spoke is secured, as will hereinafter be explained. Each disk is formed with a series of arched or curved bearings or shoulders, F', one bearing for each return-bend of each set of spokes. Shoulders F' are of a width corresponding to the diameter of the spoke, whereby the spoke may rest against the inner curved face of the same and be slightly impinged by flange E of the thimble.

G designates lugs formed radially upon the inner side of the face of the disks, the lugs being formed in pairs, one pair for each spoke, each lug being of a width to close upon the one-half of the spoke as it rests between the lugs in channels H, by which means, when the two lugs are closed upon the spoke, they closely embrace the same, and the spokes are securely held in place both from radial and lateral movement, while the lugs G, when uniformly closed upon the spokes, present a finished appearance.

It will be understood from the above description that by reason of the bent portion of the spoke being engaged with shoulder F' the rim may be suspended by any desired tension, as there is no possibility of radial movement of the spoke, and that the further fastening by reason of the lugs G and the pressure of flanges E against the spoke insures against any lateral movement of the same.

What I claim is—

1. In a metal wheel, a thimble and disks upon each end thereof, having arched bearings upon which the bent portions of the spokes engage, in combination with lugs upon the disks adapted to be bent upon the spokes, as and for the purpose set forth.

2. In a metal wheel, disks formed with radial channels terminating in a curved shoulder, the channels being adapted to be closed by bending a portion of the projecting metal which forms the same, in combination with bent spokes resting within the channels and engaging the shoulder, as and for the purpose set forth.

3. A metal wheel comprising a box having radial flanges, and disks formed with U-shaped bearings, a portion of which are of a depth to overlap the bearing, in combination with spokes held within the bearings by the overlapping portions and the radial flanges of the box, as and for the purpose set forth.

In testimony that I claim the foregoing as my own I hereby affix my signature in presence of two witnesses.

ALPHEUS KEITH.

Witnesses:
JAMES S. KEITH,
WILLIAM WEBSTER.